A. M. GRAY.
ROTARY FIELD MEMBER OF DYNAMO ELECTRIC MACHINES.
APPLICATION FILED MAY 13, 1909.

972,850. Patented Oct. 18, 1910.

Witnesses
John L. Johnson
Chas. L. Byron

Inventor
Alexander M. Gray
By Chas. E. Lord
Attorney

UNITED STATES PATENT OFFICE.

ALEXANDER M. GRAY, OF MILWAUKEE, WISCONSIN, ASSIGNOR TO ALLIS-CHALMERS COMPANY, A CORPORATION OF NEW JERSEY.

ROTARY FIELD MEMBER OF DYNAMO-ELECTRIC MACHINES.

972,850.  Specification of Letters Patent.  Patented Oct. 18, 1910.

Application filed May 13, 1909. Serial No. 495,759.

*To all whom it may concern:*

Be it known that I, ALEXANDER M. GRAY, a subject of the King of England, residing at Milwaukee, in the county of Milwaukee and State of Wisconsin, have invented certain new and useful Improvements in Rotary Field Members of Dynamo-Electric Machines, of which the following is a full, clear, and exact specification.

This invention relates to dynamo-electric machines, and particularly to means for ventilating and cooling the parts of rotating field alternators.

The invention has for its object the provision of a ventilating system for rotary field members, which will permit a more thorough circulation of air through and about the parts which become heated and a more complete dissipation of the heat than is possible with the ventilating or cooling arrangements in use at the present time.

In carrying out my invention, I provide on the rotary field member suitable fans or blowers and arrange ventilating spaces or passageways in the poles and between the poles and field coils in a manner such that the air will be forced by the fans outward between the poles and field coils which surround the poles, thence through radial slots or ventilating passageways provided in the poles, and thence outward into or against the stator core.

In one form of my invention the air enters spaces between the poles and the laterally projecting portions of the coils, then passes around the poles into spaces between the sides of the coils and poles, so that the coils are cooled on all sides, and then emerges from the outer ends of the poles, preferably passing through the radial passageways in the poles so as to effectively cool the latter.

In another form of my invention, the air after cooling the ends of the coils passes by means of transverse passageways in the poles directly to the radial passageways and thence out of the poles through said radial passageways.

My invention may be further briefly summarized as consisting in certain novel details of construction and combinations and arrangements of parts which will be described in the specification and set forth in the appended claims.

For a better understanding of my invention reference is had to the accompanying sheet of drawings, in which—

Figure 1:
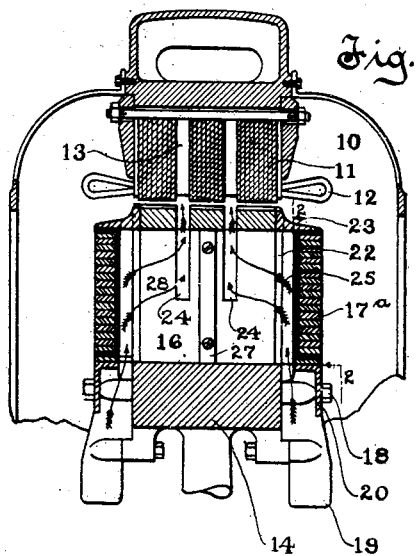
Figure 2:
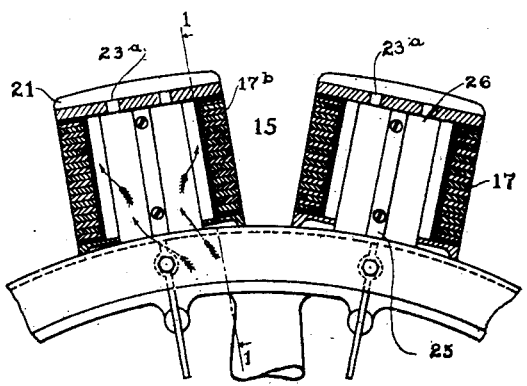
Figure 3:
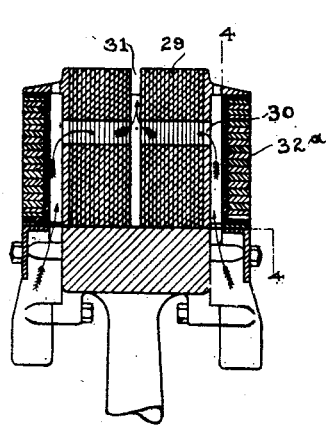
Figure 4:
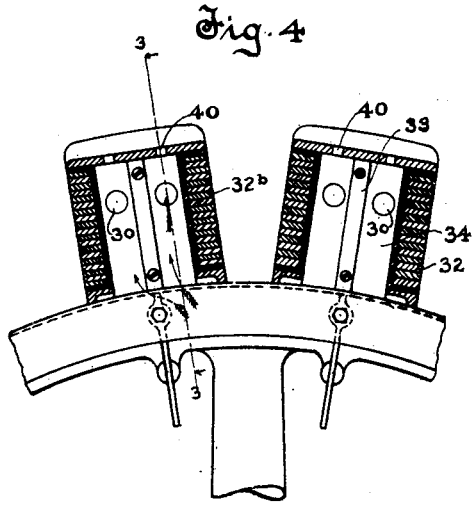

Figure 1 is a sectional view taken through a portion of the rotary and stationary members of a dynamo-electric machine constructed in accordance with my invention, the section being taken substantially along the line 1—1 of Fig. 2; Fig. 2 is a side sectional elevation of a portion of the rotary field member of the machine, two field magnets being shown, the section being taken through the field magnets substantially along the line 2—2 of Fig. 1; Fig. 3 is a transverse sectional view taken through a portion of the rotary member of the machine and showing a slight modification of my invention, the section being taken substantially along the line 3—3 of Fig. 4; and Fig. 4 is a side sectional elevation of the same, the section being taken substantially along the line 4—4 of Fig. 3.

Referring now to the figures of the drawing, and first to Figs. 1 and 2 wherein I have shown the preferred form of my invention, 10 represents a portion of the stator including a core 11 and coils 12 of the usual construction, the core being provided with the customary circumferential ventilating passageways 13. At 14 I have shown a portion of the rotary field frame, which, in this case includes a circular rim to which is secured in any suitable manner projecting field magnets 15 consisting of field poles 16, here shown solid though they can be made laminated, and field coils 17. These field magnets may be of any desired shape but as here shown are rectangular in cross section. Secured to the sides of the rim of the field frame by means of bolts 18 are combined blowers and coil supporting members including fan blades 19 and rings 20, the outer portions of which are cylindrical and are substantially flush with the periphery of the rim.

The poles 16 are provided at the outer ends with projecting pole tips 21, and with end plates 22 which are provided with laterally projecting coil retaining portions 23. The poles are provided with radial ventilating passageways 24 which extend from side to side of each pole in the direction of rotation or in planes at right angles to the shaft.

The coils 17 project laterally beyond the sides of the frame and these projecting portions 17ª, which for convenience of description will be called the ends of the coils, are supported on the rings 20 at the sides of the field frame and are spaced from the ends of the poles by radial spacing strips 25 forming air spaces 26 each of which is divided into two parts by the corresponding spacing strip 25. It will be seen that these air spaces 26 are located radially beyond the annular spaces between the rings and the sides of the frame, and just beyond the fans so that the latter may force the air directly into these spaces, which, it will be noted, are closed at the outer portions of the poles by the laterally projecting portions 23 of the end plates 22. In this case the sides 17ᵇ are spaced from the sides of the poles by spacing strips 27 forming air spaces 28, which are preferably closed at the inner and outer ends of the poles, and which communicate with the radial ventilating passageways 24 in the poles and with the air spaces 26 between the ends or the laterally projecting portions of the coils and the poles. Thus it will be seen that when the machine is in operation air will be thrown by the fans against the outer portions of the coils, and will be forced also into the spaces between the poles and the ends or portions of the coils which project beyond the sides of the frame, will thence pass around the poles into the spaces 28 between the sides of the coils and the sides of the poles and from these spaces will pass through the radial ventilating passageways 24 and will thence emerge from the poles at the outer ends thereof and be thrown against the stator, or will pass directly into the ventilating passageways of the stator. It will be seen that with this construction all parts of the coils and of the poles will be cooled by ventilating means located at the sides of the field frame.

If desired the projecting portions 23 of the plates 22 may be provided with small holes or openings 23ª, through which part of the air may pass from the spaces 26 radially outward.

In Figs. 3 and 4 I have shown a ventilating arrangement slightly different from that described above. In this case the field frame, fan or blower construction and the pole construction are the same as described above with the exception that in this instance the poles 29 are laminated, though if desired they can be solid, and are provided with transverse ventilating passageways 30 extending entirely through the poles and communicating with the single radial ventilating passageway 31 provided in each pole. The coils 32 have portions 32ª which project laterally beyond the sides of the frame, as in the first instance, and are supported on the rings of the blowers, these portions being spaced from the poles by radial strips 33 forming air spaces 34 so located as to receive the air directly from the fans. The sides 32ᵇ of the coils are, in this case, not spaced from the corresponding sides of the poles, and in consequence the main outlets for the air which is forced by the fans into the air spaces 34 are the transverse passageways 30. The air will therefore enter freely into the spaces 34, cooling the end or projecting portions of the coils, will pass from these spaces through the transverse passageways 30 and thence through the radial passageways 31 of the poles thoroughly cooling the latter. If desired, small holes 40 may be provided in the coil retaining portions of the end plates to permit part of the air to flow directly outward from the spaces 34.

I do not desire to be confined to the exact details shown, but aim in my claims to cover all modifications which do not depart from the spirit and scope of my invention.

What I claim as new is:

1. In a dynamo-electric machine, a rotary field member comprising a frame having outwardly projecting field magnets and at the sides ventilating fans or blowers, said field magnets comprising poles having radial ventilating passageways and field coils having portions which project laterally beyond the frame and are spaced from the poles, forming between the poles and coils air spaces which communicate with the radial ventilating passageways in the core so that air will be forced by said fans into the spaces between the coils and the poles and thence through said radial passageways in the poles.

2. In a dynamo-electric machine, a rotary field member comprising a frame having projecting field magnets and fans or blowers at the sides of the frame, said magnets comprising poles having radial air passageways and coils which are spaced from the poles forming between the latter and the coils air spaces, portions of the coils projecting laterally beyond the sides of the frame so that air will be forced by said fans into the spaces between the poles and the laterally projecting portions of the coils, thence around the poles, and thence through said radial passageways in the poles.

3. In a dynamo-electric machine, a rotary field member comprising a frame having at the sides fans or blowers and having projecting field magnets comprising field poles having ventilating passageways and field coils which surround the poles and are spaced therefrom so as to form between the poles and coils air spaces which extend about the poles, the end portions of the coils projecting beyond the sides of the frame so that air may be forced by said fans outwardly between the coils and the poles and will thence escape through said passageways in the poles.

4. In a dynamo-electric machine, a rotating field member comprising a frame having projecting field magnets and blowers at the sides of the frame including fan blades and coil supporting rings which are spaced from the sides of the rim, said field magnets comprising poles having radial ventilating passageways which extend in the plane of rotation, and field coils, the sides and ends of the coils being spaced from the poles and the ends resting on said rings of the blowers so that air may be forced outward by the fans between the ends of the coils and the poles and thence may pass freely around the poles and emerge from the latter through the radial passageways thereof.

5. In a dynamo-electric machine, a stator, a rotary field member comprising a frame having projecting field magnets and having at the sides fan blades and coil supporting rings which are spaced from the frame, said field magnets including field poles having radial ventilating passageways and coils which are spaced from the poles on all sides and have end portions which extend beyond the frame and rest upon the rings, the spaces between the coils and the poles providing free passageways for the air which is forced by the fans outwardly along the sides of the rim into the spaces between the coils and poles, around to the sides of the poles, and thence outward into the stator through the radial ventilating openings in the poles.

6. In a dynamo-electric machine, a rotary member comprising a frame having projecting field magnets including poles and coils surrounding the poles, the coils having end portions projecting beyond the frame and spaced from the corresponding portions of the poles, means projecting laterally of the poles and retaining the coils on the poles, said means having ventilating openings, and ventilating means carried by the frame and serving to force air outward between said means and the coils and through said openings.

Milwaukee, Wis., May 10, 1909.

In testimony whereof I affix my signature, in the presence of two witnesses.

ALEXANDER M. GRAY.

Witnesses:
  CHAS. L. BYRON,
  ROB. E. HALL.